United States Patent [19]
Arph et al.

[11] Patent Number: 5,443,857
[45] Date of Patent: Aug. 22, 1995

[54] METHOD AND APPARATUS FOR CONTINUOUS STERILIZATION OF A LIQUID MILK BASED PRODUCT

[75] Inventors: Olle Arph, Lund; Bengt Palm, Genarp; Bozena Malmgren, Lund; Roland Ringstrom, Veberod, all of Sweden

[73] Assignee: Tetra Laval Holdings & Finance S.A., Pully, Switzerland

[21] Appl. No.: 208,592

[22] Filed: Mar. 11, 1994

[30] Foreign Application Priority Data

Mar. 29, 1993 [SE] Sweden ................... 9301027

[51] Int. Cl.$^6$ .................... A23L 1/00; A23C 3/00
[52] U.S. Cl. .................... 426/522; 99/454; 99/470; 99/472; 165/66; 426/511
[58] Field of Search .............. 426/511, 522, 524; 99/454, 470, 472, 483; 165/66

[56] References Cited

U.S. PATENT DOCUMENTS

| | | | |
|---|---|---|---|
| 3,512,998 | 9/1967 | Clark | 426/522 |
| 3,567,470 | 6/1968 | McElroy | 426/522 |
| 4,175,141 | 11/1979 | Adams, Jr. et al. | 426/522 |
| 4,610,298 | 9/1986 | van Schagen et al. | 165/66 |
| 4,997,662 | 3/1991 | Lidman et al. | 426/522 |

FOREIGN PATENT DOCUMENTS 1163372 4/1969 United Kingdom.
2209919 10/1990 United Kingdom.

*Primary Examiner*—George Yeung
*Attorney, Agent, or Firm*—Davis Hoxie Faithfull & Hapgood

[57] ABSTRACT

A method of sterilizing a liquid milk based product comprises indirect preheating of the product and final heating to a sterilization temperature 140°–150° C. by direct steam injection. The product is cooled by so called flash-cooling at which steam corresponding to the added amount of steam is evaporated. The product is cooled by indirect cooling. It is now proposed that the product prior to the flash-cooling is cooled from the sterilization temperature 140°–150° C. to a temperature in the interval 90°–120° C. in an indirect, first cooling step after which the product is cooled by flash-cooling to a temperature of 70°–85° C. The apparatus for sterilization comprises a balance vessel (1) connected to an indirectly working first heat exchanger (4) for heating of the milk based product. A steam injection nozzle (6) is arranged in a pipe line out from the heat exchanger (4). After the steam injection nozzzle (6) there is a holding section (8) and a vacuum vessel (10) in which the product is cooled by flash-cooling. A further indirectly working heat exchanger (9) for cooling of the product is connected between the holding section (8) and the vacuum vessel (10).

9 Claims, 1 Drawing Sheet

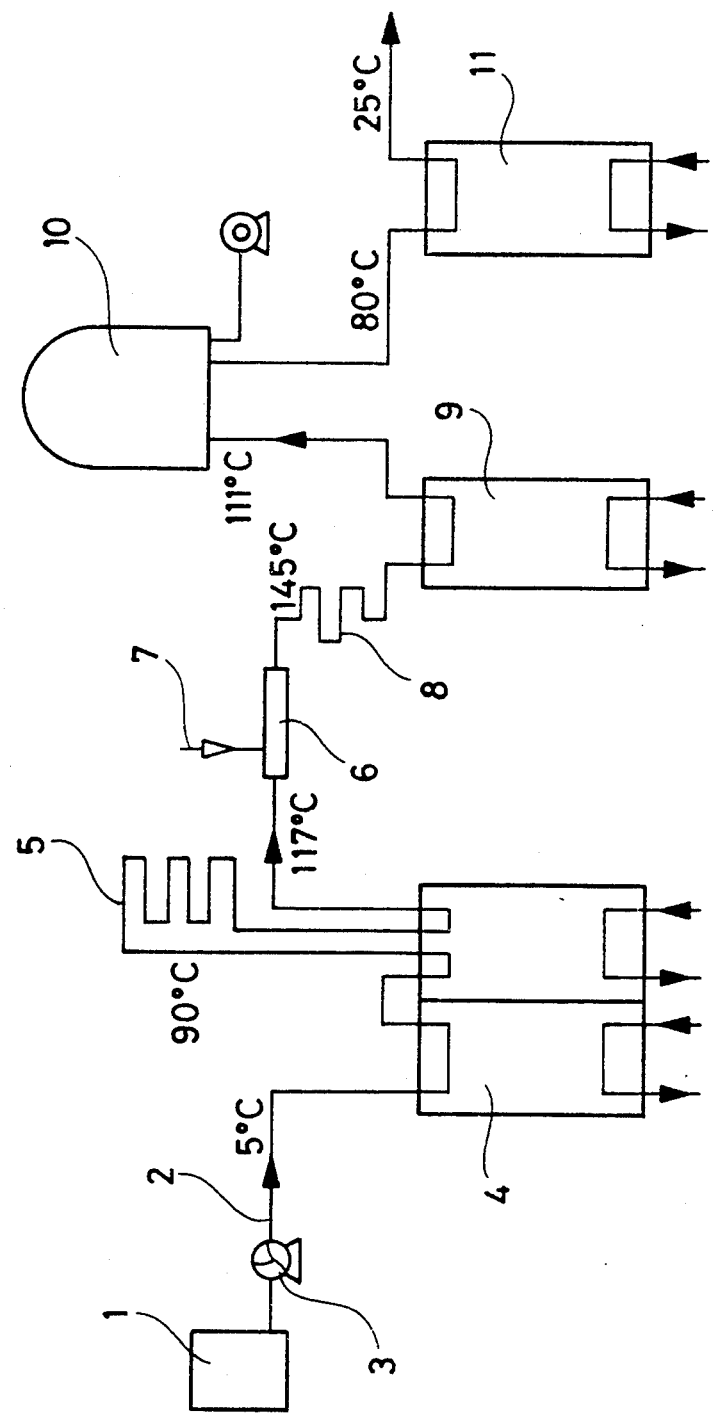

METHOD AND APPARATUS FOR CONTINUOUS STERILIZATION OF A LIQUID MILK BASED PRODUCT

The present invention relates to a method for continuous sterilization of a liquid milk based product and an arrangement for carrying through this method. The product is preheated by indirect heating and is then heated to a sterilization temperature 140°–150° C. by means of injection of steam directly into a flow of product. After sterilization the product is cooled by so called flash-cooling, at which water vapour corresponding to the added amount of steam is evaporated and the product is cooled by indirect cooling.

By injecting the steam directly into the product there is obtained a very rapid heating up to sterilization temperature. Continuous processes with direct steam injection in milk, known as UHT-treatment, were presented in the beginning of the 60th and are described for example in SE 218 503 (GB 937 782). UHT means Ultra High Temperature.

As a consequence of the energy crisis in the 70th indirect processes for UHT treatment were presented. In the indirect processes a large amount of the added heat energy may be recovered, while the heat energy which is added to the milk when the heat media is added as steam is lost during the flash cooling.

The direct heating of the milk to sterilization temperature followed by flashing may be carried through so rapidly that the holding time at sterilization temperature will be only a few seconds while the obtained bacteriological effect still is sufficient. The indirect sterilization is necessarily slower and the time that the milk is kept at a temperature above 120° C. is considerably longer. The longer time the milk is kept at such a high temperature the more damages are obtained on the different components in the milk. A strong heat treatment results in high lactulose values which is considered as a measure of the damages of the milk and in that indicates a lower milk quality.

The interest for direct UHT-processes has now increased again partly because some high resistant bacteria spores have been found in the milk delivered to the dairies periodically, but also because it is desirable to achieve a better quality, i.e. sterile but also high qualitative products.

According to the invention there is now proposed a new way of carrying through the sterilization treatment which gives a better quality of the treated products, i.e. a minor formation of lactulose but still a good operation economy for the sterilization.

The method according to the invention is mainly characterized in that the milk based product prior to the flash cooling is cooled from a sterilization temperature of 140°–150° C. by means of an indirect cooling step to a temperature in the interval 90°–120° C., at which the product is cooled by flash-cooling to a temperature of 70°–85° C.

The liquid milk based products may apart from milk with different fat content consist of cream, reconstituted milk, icecream mix or condensed or evaporated milk.

Milk based products are sensitive for mechanical influence at temperatures above 110° C. According to the proposed method the product is cooled in a mechanically gentle way down to a temperature in the interval of 90°–120° C. and the flash cooling, i.e. the evaporation of steam, starts firstly at this lower level. A lesser amount of incrustations of milk based product on the walls of the vacuum vessel is obtained at this lower operation temperature. The different milk components are subjected to fewer damages and a more high qualitative milk product is obtained according to the invention. Apart from fewer damages on the product the deaeration and deodorization are carried through in a better way according to the invention.

If the product is to be heated to a sterilization temperature of 140° the steam needed in an indirectly working heat exchanger system is 25–30 kg steam/1000 kg product.

In order to heat the product to the same temperature by steam injection and flashing 135 kg steam are needed per 1000 kg product.

According to the present invention only 70–75 kg steam are used per 1000 kg product.

The water consumption is rather low when indirectly working processes are used. The heating and cooling water may be circulated in closed circuits.

In a direct system working with steam the water consumption is high since a high amount of water, 1000 l cooling water/1000 l product, is needed to cool the vessel where the flash-cooling takes place.

When using the method according to the invention only the half of this amount is needed since the flash-cooling is carried through at a lower temperature.

According to the method of the invention the preheatment of the milk based product is carried through by an indirect heating to a temperature of 90°–125° C., preferably to a temperature of 115°–120° C., after which the final heating by way of steam injection into the product takes place. Earlier the preheating has usually only been to ∼80° C. This means that the amount of steam needed to increase the temperature during the steam injection step is reduced.

The method according to the invention usually comprises a protein-stabilizing step during the preheating. The product is kept at the desired temperature during 0.5–5 minutes after a heating to 80°–100° C.

According to the method of the invention the sterilized product is suitably homogenized in a step which is arranged after the flash-cooling. Usually the steam injection is carried through in a steam injection nozzle in which both steam and product are added in the form of concentric flows.

The proposed method is with advantage carried through in that the cooling of the product from sterilization temperature in the first indirect cooling step is carried through with a cooling rate which is above 5° C./sec., i.e. the temperature of the product is lowered with at least 5° C. per second. If it is suitable the cooling rate may be increased to 7°–11° C. per second.

An arrangement for continuous sterilization of a liquid milk based product according to the method of the invention comprises a balance vessel for the product. A first indirectly working heat exchanger is connected to the balance tank. This heat exchanger comprises one or several preheating steps. A steam injection nozzle is arranged in a pipe line out from the heat exchanger and after the heat injection nozzle there is a holding section. The arrangement also comprises a vacuum vessel in which the product is cooled by way of flash cooling and a second indirect heat exchanger for cooling of the product. The arrangement is mainly characterized in that a further indirectly working heat exchanger for cooling of the product after the steam injection is arranged between the holding section and the vacuum vessel.

With advantage this further heat exchanger (cooler) consists of a tubular heat exchanger, where the temperature difference between the cooling media, usually water, and the product is kept high.

The present invention is described further with reference to the attached drawing which shows an embodiment of the invention chosen as an example only. Also the temperatures which are given on the drawing must be considered as examples.

A balance vessel 1 for the product which shall be treated according to the method of the invention is connected by way of the pipe line 2 to a pump 3 connected to an indirectly, working heat exchanger 4 with in this case two preheating steps. When the product has been heated to a suitable temperature, 90° C., it is brought to pass a holding cell 5 for stabilization of the protein. The product is then returned to the heat exchanger for another preheating to 117° C. The product is then brought to pass a steam injection nozzle 6 in which the product is mixed with steam 7 and at that heated to a temperature of 145° C. After a passage of a short holding section 8 the product is cooled by means of water in a directly working heat exchanger 9 to a temperature of 111° C. From the heat exchanger 9 the product is led further to a vacuum vessel 10 in which the product is flash-cooled by evaporating as much liquid as was added by the steam. The product leaves the vacuum vessel with a temperature of 80° C. and is then cooled in a second indirectly working heat exchanger 11 to a temperature of 25° C.

If it is considered suitable a further pressure rising pump may be arranged between the preheating steps.

A homogenisator for homogenizing of the product may be connected after the vacuum vessel or possibly after the first preheating step.

We claim:

1. In a method for the continuous sterilization of a liquid milk based product which comprises preheating the product by indirect heating, heating the preheated product to a sterilization temperature of 140°–150° C. by direct injection of steam into the product, cooling the heated product by flash/cooling in which steam corresponding to the added amount of steam is evaporated and finally cooling by indirect cooling, the improvement which comprises cooling the product, prior to said flash cooling, from the sterilization temperature of 140°–150° C. to a temperature in the range of 90°–120° C. in an indirect cooling step, and subsequently cooling the product by flash cooling to a temperature of 70°–85° C.

2. Method according to claim 1 wherein the preheating takes place to a temperature of 90°–125° C., after which steam injection takes place.

3. Method according to claim 2, wherein the preheating takes place to a temperature of 115°–120° C. after which steam injection takes place.

4. Method according to claim 2, wherein the preheating comprises a protein stabilizing step in which the product after heating to a temperature of 80°–100° C. is kept at this temperature for 0.5 minutes.

5. Method according to claim 1, wherein the sterilized product passes to a homogenizing step arranged after the flash-cooling.

6. Method according to claim 1, wherein the steam injection takes place in a steam injection nozzle with feeding of concentric flows of steam and product.

7. Method according to claim 1, wherein the cooling of the product from sterilization temperature in the indirect cooling step takes place with a cooling rate which is above 5° C./sec.

8. Apparatus for continuous sterilization of a liquid milk based product, which comprises a first indirectly working heat exchanger for preheating the milk based product connected to a balance vessel, which first heat exchanger comprises one or several heating sections, a steam injection nozzle arranged in a pipe line leading out of the first heat exchanger, a holding section after the steam injection nozzle, a vacuum vessel in which the product is cooled by way of flash-cooling, a second indirectly working heat exchanger for cooling the product, and additionally comprising a further indirectly working heat exchanger for cooling of the product, connected between the holding and the the vacuum vessel.

9. Apparatus according to claim 8, wherein said further heat exchanger consists of a tube heat exchanger.

* * * * *